United States Patent
Ohtsu (10) Patent No.: US 7,605,995 B2
(45) Date of Patent: Oct. 20, 2009

(54) SERVO WRITER, SIGNAL OUTPUT CONTROL METHOD AND MANUFACTURING METHOD OF MAGNETIC TAPE USING THE SIGNAL OUTPUT CONTROL METHOD

(75) Inventor: Hiroki Ohtsu, Kanagawa (JP)

(73) Assignee: FUJIFILM Corporation, Tokyo (KP)

( * ) Notice: Subject to any disclaimer, the term of this patent is extended or adjusted under 35 U.S.C. 154(b) by 406 days.

(21) Appl. No.: 11/723,866

(22) Filed: Mar. 22, 2007

(65) Prior Publication Data

US 2007/0223125 A1    Sep. 27, 2007

(30) Foreign Application Priority Data

Mar. 23, 2006  (JP) .............................. 2006-079949

(51) Int. Cl.
  *G11B 21/02* (2006.01)
(52) U.S. Cl. ..................... 360/75; 360/46; 360/77.12
(58) Field of Classification Search ........................ None
  See application file for complete search history.

(56) References Cited

U.S. PATENT DOCUMENTS 6,078,463 A * 6/2000 Pahr ..................... 360/77.12
6,249,396 B1 * 6/2001 Gray ........................... 360/55
6,970,312 B2   11/2005 Yip et al.
7,136,254 B2 * 11/2006 Nakao et al. ............. 360/77.12
2005/0047008 A1 * 3/2005 Tateishi ...................... 360/121
2005/0052779 A1   3/2005 Nakao et al.
2005/0099718 A1   5/2005 Takano et al.
2005/0105967 A2   5/2005 Nakao
2005/0168869 A1   8/2005 Dugas et al.
2005/0219734 A1   10/2005 Rothermel et al.
2006/0092545 A1 * 5/2006 Shirouzu ..................... 360/64

FOREIGN PATENT DOCUMENTS

JP   2003141836 A * 5/2003
JP   2004-318977 A   11/2004
JP   2005-85328 A    3/2005

\* cited by examiner

*Primary Examiner*—Jason C Olson
(74) *Attorney, Agent, or Firm*—Sughrue Mion, PLLC (57) ABSTRACT

A recording current to be supplied to a magnetic head is regulated by a signal output control unit. A peak value (either of positive-going peak value and a negative-going peak value) is detected in each pulse of a digital signal resulting from analog-to-digital conversion of a servo signal recorded on a servo band of a magnetic tape. The peak value is transmitted as an input value which is allowed to follow a change in the peak value as long as a frequency calculated based upon times of detection of respective peak values is below a predetermined frequency. An output value of the recording current is determined based upon the transmitted input value.

18 Claims, 7 Drawing Sheets

FIG.1A

FIG.1B SERVO SIGNAL READ-OUT SIGNAL

FIG.1C RECORDING PULSE CURRENT PC

INPUT VALUE / OUTPUT VALUE
CORRESPONDENCE INFORMATION TABLE
164

| INPUT VALUE | OUTPUT VALUE |
| --- | --- |
| A1 | B1 |
| A2 | B2 |
| A3 | B3 |
| A4 | B4 |
| ⋮ | ⋮ |

FIG.7

SERVO WRITER, SIGNAL OUTPUT CONTROL METHOD AND MANUFACTURING METHOD OF MAGNETIC TAPE USING THE SIGNAL OUTPUT CONTROL METHOD

CROSS-REFERENCE TO RELATED APPLICATION(S)

This application claims the foreign priority benefit under Title 35, United States Code, §119 (a)-(d), of Japanese Patent Application No. 2006-079949, filed on Mar. 23, 2006 in the Japan Patent Office, the disclosure of which is herein incorporated by reference in its entirety.

BACKGROUND OF THE INVENTION

This invention relates to a servo writer for recording a servo signal on a servo band of a magnetic tape, a signal output control method, a signal output control program, and a manufacturing method of a magnetic tape using the signal output control method.

The rapid-paced advance of information storage technologies has been making storage media, such as magnetic tape, denser in recent years. High-density packing has been realized magnetically; for example, 400 gigabytes of data can be stored for computer backup on a reel of magnetic tape. For such high-density packing on a magnetic tape, hundreds of data tracks are arranged across the width of the tape. Accordingly, the widths of the data tracks have become very narrow, and the spacings between adjacent data tracks have become very narrow, too. In order to allow a read/write element of a magnetic head to trace the data tracks, servo control is exercised over the position (across the width of the magnetic tape) of the magnetic head, based on a servo signal that has been recorded beforehand on the magnetic tape and is read out by the magnetic head during reading/writing operations.

In a magnetic tape information recording/retrieving system, a point of change in magnetism in a servo signal is detected by a servo signal read element (magnetoresistive or MR element) detecting a change in electric resistance, and the point of change in magnetism is output as a read-out signal in a differential waveform (voltage value). Accordingly, the greater the change in the electric resistance of the MR element is, the greater a peak voltage value of the read-out signal in the servo signal becomes, which improves a signal-to-noise ratio of the read-out signal.

However, assuming that the oncoming stage of higher recording density of the magnetic tape to the order of ten terabytes arrives in the near future, according as the recording density becomes higher, the number of data tracks will increase, the widths of data tracks will become narrower, and the spacings between adjacent data tracks will become narrower, while the thickness of magnetic tape will become thinner. In consequence, the amount of detectable magnetism in the servo signal to be detected by the read element would decrease, and the peak voltage value of the read-out signal from the recorded servo signal would become smaller, so that the signal-to-noise ratio of the read-out signal would become lower. This trend would eventually deprive the magnetic tape information recording/retrieving system of its important feature of accurately reading a servo signal, thus disabling the system from controlling the position of the magnetic head at worst.

In order to improve the signal-to-noise ratio of a read-out signal to be acquired from a servo signal, a method as disclosed for example in JP 2004-318977 A (a family U.S. patent application also published under US 2005/0105967 A2) proposes magnetizing a magnetic tape along the length in one direction (one of lengthwise directions; e.g., a tape-transport direction) of the magnetic tape, to obliterate a servo band using an erasing head energized by a direct current (hereinafter referred to as direct-current erase or "DC erase"), and thereafter writing a servo signal on the servo band by forming a servo pattern magnetized in a direction opposite to the one direction in the servo band. When the servo signal recorded in accordance with this method is retrieved by a servo signal read element of the magnetic head, the quantity (rate) of change in magnetization of the magnetic field detected at the boundary between the ground (area magnetized in one direction, i.e., DC erased) and the figure (servo pattern formed by magnetization in a direction opposite to the one direction) is expected to be greater (higher), and thus the output of a read-out signal to be acquired from the servo signal is expected to be larger. As a result, the signal-to-noise ratio of the read-out signal to be acquired from the servo signal can be improved (see Paragraphs 0026-0027 and FIG. 1 of JP 2004-318977 A).

In order to stabilize an output value of a read-out signal to be acquired from a servo signal, a method as disclosed for example in JP 2005-85328 A (a family U.S. patent application also published under US 2005/0052779 A1) proposes controlling an erasing current supplied to a DC erasing head based upon the output value of the read-out signal acquired from the servo signal by a servo signal read element of the magnetic head. In this method, a recording current supplied to a DC erasing head or a servo signal write head is controlled such that an output value of the read-out signal to be acquired from the recorded servo signal is kept substantially constant, based upon the output value of the read-out signal acquired from the servo signal that has already been recorded. Accordingly, even when the magnetic tapes having a magnetic layer varying in thickness are supplied (i.e., how thin the magnetic layer is formed varies from tape to tape and even within the same tape), a servo signal can be recorded on a servo band thereof on an adequate level of quality, and the output value of the read-out signal to be acquired from the servo signal can be stabilized (see Paragraphs 0031-0034 and FIG. 2 of JP 2005-85321 A).

Various related techniques for improving a signal-to-noise ratio of a servo signal are known in the art, in which an area corresponding to a servo band on a magnetic tape is magnetized entirely in one direction along the length (i.e., the direction of magnetization or magnetic moment is one of lengthwise directions), and a servo signal is recorded by forming a servo pattern magnetized in a direction opposite to the one direction within the area, thereby forming the servo band. See, for example, US Patent Documents: U.S. Pat. No. 6,970,312 B2, US 2005/0099718 A1, US 2005/0168869 A1 and US 2005/0219734 A1.

However, the aforementioned techniques are all premised that a servo signal is detected with the envelope detection technique using an analog circuit, and variations which would appear in components, such as a capacitor, a diode, etc. making up the circuit for detecting a servo signal could cause problems in its reliability. Moreover, the circuit used for detecting a servo signal should be designed specifically for use with a particular type of device different among types of devices varying in servo patterns and/or in operating speeds, and thus it is often the case that a circuit designed to detect a servo signal in one device cannot be used by connecting with another device. Little flexibility in connecting with a different type of the device would be a disadvantage to be overcome.

In the technique as disclosed in JP 2005-85321 A, dropouts or read-out errors of a servo signal, which could occur for some reasons, would disadvantageously affect its recording current stabilizing feature, thus making it difficult to output a recording current controlled with high precision based upon variations in thickness of the magnetic layer.

Against this backdrop, the present invention has been made in an attempt to eliminate the above disadvantages. Therefore, apparatuses and methods consistent with the present invention may relate to a servo writer, a signal output control method, a signal output control program and a manufacturing method of a magnetic tape using the signal output control method, in which variations in components making up the circuit for detecting a servo signal can be reduced, and/or flexibility in connecting with a different type of the device can be improved, and/or a high-precision recording current can be output based upon variations in thickness of the magnetic layer.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a servo writer comprising a direct-current erasing head, a servo signal write head, a verification head, an analog-to-digital converter, and a signal output controller. The direct-current erasing head is configured to magnetize a servo band of a magnetic tape, wherein a direction of magnetization thereof is a first direction of lengthwise directions of the magnetic tape. The servo signal write head is configured to record a servo signal on the servo band by magnetization of which a direction is a second direction opposite to the first direction. The verification head is configured to retrieve the servo signal recorded on the servo band. The analog-to-digital converter is configured to convert the servo signal retrieved by the verification head to a digital signal. The signal output controller is configured to regulate a recording current to be supplied to at least one of the direct-current erasing head and the servo signal write head. The signal output controller comprises a peak value detection unit, a low-pass filter unit and an output determination unit. The peak value detection unit is configured to detect a peak value in each pulse of the digital signal output from the analog-to-digital converter, wherein the peak value comprises either of a positive-going peak value and a negative-going peak value. The low-pass filter unit is configured to transmit as an input value the peak value received from the peak value detection unit, wherein the input value is allowed to follow a change in the peak value as long as a frequency calculated based upon times of detection of respective peak values is below a predetermined frequency. The output determination unit is configured to determine an output value of the recording current, based upon the input value transmitted through the low-pass filter unit. Preferably but not necessarily, the signal output controller may further comprise an absolute value calculation unit configured to calculate an absolute value of a difference of the positive-going peak value and the negative-going peak value in each pulse, wherein the low-pass filter unit is configured to transmit as an input value the absolute value received from the absolute value calculation unit, and the input value is allowed to follow a change in the absolute value as long as a frequency calculated based upon times of detection of respective peak values corresponding to the absolute values is below a predetermined frequency.

With this configuration, the signal output controller of the servo writer can perform a process step of determining an output value of the recording current based upon a digitized servo signal (e.g., by a computer program stored in a computer readable medium, which causes a computer to perform the process step). Therefore, variations in components making up the circuit for detecting a servo signal can be reduced, and/or flexibility in connecting with a different type of the device can be improved. Since a recording current reflecting the state of each pulse can be output, a high-precision recording current based upon variations in thickness of the magnetic layer can be output.

BRIEF DESCRIPTION OF THE DRAWINGS

The above aspects, other advantages and further features of the present invention will become more apparent by describing in detail illustrative, non-limiting embodiments thereof with reference to the accompanying drawings, in which:

FIGS. 1A, 1B and 1C depict a magnetic tape consistent with an exemplary embodiment of the present invention, in which

FIGS. 5A and 5B are graphical representations showing correspondence of an absolute value of a difference of a positive-going peak value and a negative-going peak value in each pulse, which is calculated by an absolute value calculation unit according to an exemplary embodiment of the present invention, with a time of detection of one of the positive-going peak value and the negative-going peak value corresponding to the absolute value, in which

DETAILED DESCRIPTION OF THE EXEMPLARY EMBODIMENTS

Exemplary embodiments of the present invention will be described in detail with reference to the accompanying drawings.

In the illustrated embodiments, a servo band of a magnetic tape is magnetized entirely in a first direction of lengthwise directions of the magnetic tape, and thereafter a servo signal is recorded on the servo band by magnetization of which a direction is a second direction opposite to the first direction.

The following discussions of exemplary embodiments of the present invention focus first on a layout of recording surface of a magnetic tape which will be explained with reference made to FIG. 1, then on a setup of a servo writer for recording a servo signal on the magnetic tape which will be explained with reference made to FIG. 2, and a manufacturing method of a magnetic tape using the servo writer which will be explained with reference made to FIG. 3.

[Magnetic Tape Layout]

A magnetic tape MT according to an exemplary embodiment of the present invention comprises a plurality of servo bands SB extending in the lengthwise directions of the magnetic tape MT, and a plurality of data bands each arranged between adjacent servo bands SB.

Each servo band SB is magnetized entirely in a tape-transport direction (hereinafter referred to as "normal direction" where appropriate) which is one of two opposite lengthwise directions (parallel to edges) of the magnetic tape MT. The direction of magnetization is indicated by small arrows in FIG. 1. Servo signals SS are written on the servo bands SB by forming servo patterns SP magnetized in a reverse direction (a direction opposite to the normal direction) of the magnetic tape MT.

In the illustrated embodiment, each servo signal SS is formed in a series of servo patterns SP (servo frames) each consisting of a burst Ba and a burst Bb. The burst Ba is a magnetized portion in two parallel stripes inclined forwardly with respect to the tape-transport direction of the magnetic tape MT. The burst Bb, which follows the burst Ba, is a magnetized portion in two parallel stripes inclined backwardly with respect to the tape-transport direction. The servo patterns SP are formed in series along the length of each servo band SB of the magnetic tape MT with predetermined intervals left between adjacent servo patterns SP, to thereby record a servo signal SS.

Figure 1A:
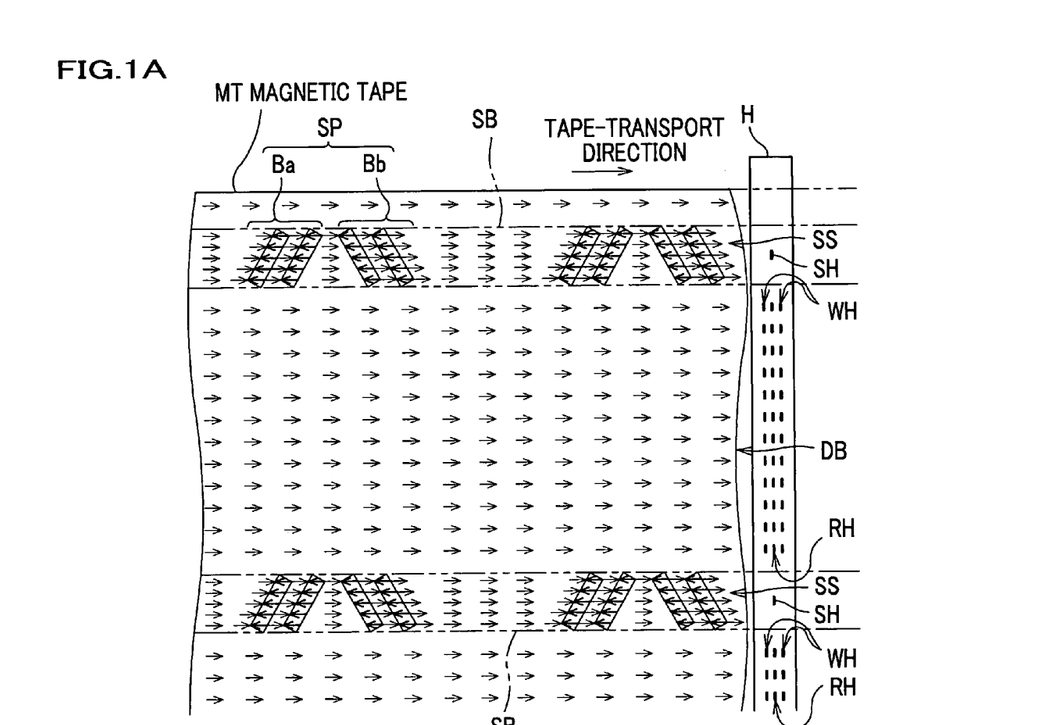
FIG. 1A is an enlarged plan view of the magnetic tape showing a state of magnetization on a surface thereof.

Although one servo pattern SP (servo frame) in the present embodiment consists of two forwardly inclined stripes and two backwardly inclined stripes, the servo patterns formed by servo writers to which the present invention is applicable are not limited to this embodiment. Alternative examples of servo pattern SP may include, for example: a servo frame consisting of five forwardly inclined stripes and five backwardly inclined stripes; and a servo frame consisting of two alternating servo subframes each comprised of a first servo subframe consisting of five forwardly inclined stripes and five backwardly inclined stripes and a second subframe consisting of four forwardly inclined stripes and four backwardly inclined stripes. In FIG. 1A, the servo patterns SP are exaggerated in size relative to the magnetic tape MT for the purpose of illustration so as to facilitate the understanding of the servo signal SS makeup.

In the illustrated embodiment, data bands DB arranged between adjacent servo bands SB are also magnetized entirely, and preferably uniformly, in the normal direction of magnetization. Illustrated in FIG. 1A is a magnetic tape MT on which no data is recorded. Once any data are recorded on the magnetic tape MT, areas magnetized in the normal or reverse directions are formed in accordance with the contents of the recorded data.

(Relative Positions of Magnetic Tape and Magnetic Head)

FIG. 1A shows a magnetic head H of a magnetic tape information recording/retrieving system (not shown) which is positioned relative to the magnetic tape MT.

The magnetic head H includes a plurality of servo signal read elements SH arranged in a widthwise direction of the magnetic tape MT at the same intervals as those of the plurality of servo bands SB. Each servo signal read element SH is configured to retrieve a servo signal SS recorded on the corresponding servo band SB. Between adjacent servo signal read elements SH, a plurality of write elements WH for recording signals on each data band DB are arranged in two rows extending the widthwise direction of the magnetic tape MT. Between the rows of the write elements WH, a plurality of read elements RH for retrieving the recorded signals from the data band DB are arranged in a row extending the widthwise direction of the magnetic tape MT, in such a way that each read element RH is sandwiched between two corresponding write elements WH located in the respective rows, in this embodiment.

When data is recorded on or retrieved from the magnetic tape MT by using the magnetic head H as described above, a servo signal SS is retrieved by the servo signal read element SH. In this operation, pulse detection timing with which the servo signal read element SH retrieves the servo signal SS and detects a pulse varies according to the widthwise position (i.e., position in the widthwise direction of the magnetic tape MT) of the magnetic head H relative to the magnetic tape MT, because the servo patterns SP for the servo signal SS are formed with nonparallel stripes inclined with respect to the tape-transport direction of the magnetic tape MT. Using the varying pulse detection timing, the position of the magnetic head H is adjusted in the widthwise direction of the magnetic tape MT in such a way that the pulse detection timing comply with a predetermined condition. Thus, a control (tracking control) can be exercised over the position of the magnetic head H so that the write elements WH or the read elements RH are positioned accurately at predetermined locations corresponding to the tracks formed in the data band DB.

The output (peak voltage value) of a read-out signal the servo signal read element SH acquires from a servo signal SS depends upon a rate of change or a quantity of change in magnetization of a magnetic field detected at a boundary between an area in which a signal is recorded and an area in which a signal is not recorded.

Figure 1B:
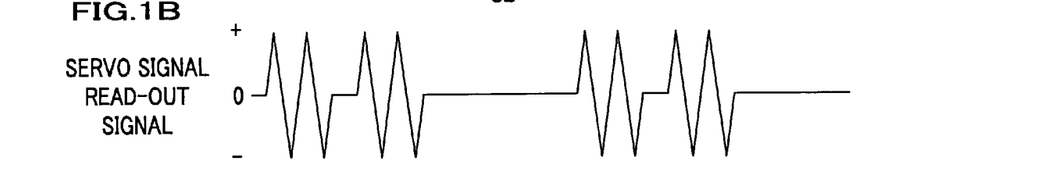
FIG. 1B is a graphical representation of a servo signal (read-out signal) retrieved from the magnetic tape.

In the present embodiment, the direction of magnetization is changed appreciably from the normal direction to the reverse direction or vice versa (from the reverse direction to the normal direction) at the boundary between the ground (area in which the direction of magnetization is the normal direction) and the figure (servo pattern SP formed by magnetization of which the direction is the reverse direction) in the servo band SB. Based upon the appreciable quantity of change in magnetization, the servo signal read element SH can acquire a large output of a read-out signal from the servo signal SS, as shown in FIG. 1B. Accordingly, the read-out signal can be acquired from the servo signal SS at an enhanced signal-to-noise ratio.

[Servo Writer Setup]

The servo signal SS on the magnetic tape as described above is recorded by a servo writer. A detailed description of a setup of the servo writer will be given hereafter. Portions of the magnetic tape MT may be mentioned in the following description, with reference made to FIG. 1A where appropriate.

Figure 2:
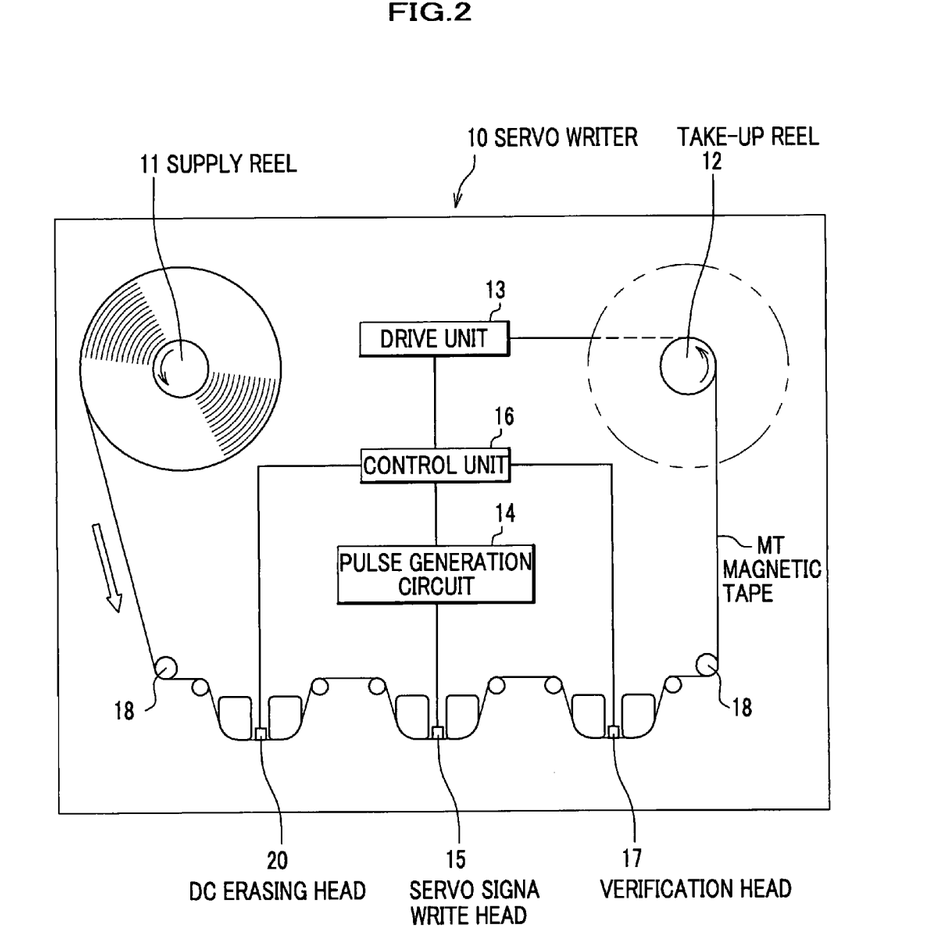
FIG. 2 is a schematic diagram showing a servo writer according to an exemplary embodiment of the present invention.

Referring now to FIG. 2, a servo writer 10 for recording a servo signal SS in a servo band SB on a magnetic tape MT includes a supply reel 11, a take-up reel 12, a drive unit 13, a pulse generation circuit 14, a servo signal write head 15, a control unit 16, a verification head 17, and a DC erasing head 20. Components further provided in the servo writer 10 include a power supply (not shown), a cleaning device (not shown) for cleaning the magnetic tape MT, and other peripheral devices.

(Supply Reel and Take-Up Reel)

To manufacture the magnetic tape MT, a wide web roll of magnetic-coated base film is slit into tapes of a product width at the outset. The resulting magnetic tape MT is then wound up into a large-diameter pancake which in turn is set in the supply reel 11 prior to a time when writing of a servo signal SS takes place; thus, the supply reel 11 starts to supply the magnetic tape MT when writing of a servo signal SS begins. The magnetic tape MT supplied from the supply reel 11 is guided by tape guides (not shown), a guide roller 18, etc. to the DC erasing head 20, and the servo signal write head 15 and then to the verification head 17. The magnetic tape MT is passed across the DC erasing head 20, the servo signal write head 15 and the verification head 17, and led to the take-up reel 12. The take-up reel 3 is driven by the drive unit 13 to rotate so as to take up the magnetic tape which has been passed across the DC erasing head 20, the servo signal write head 15 and the verification head 17.

(Drive Unit)

The drive unit 13 is a device for rotating the take-up reel 12, and typically includes a motor, a motor drive circuit for supplying a current to the motor, gears for coupling the take-up reel 12 with an output shaft of the motor, and other components, though not illustrated in the drawings. The drive unit 13 is configured to receive a motor current signal from the control unit 16, generate a motor current in the motor drive circuit based upon the motor current signal, supply the motor current to the motor, transmit a rotary driving force of the motor through the gears to the take-up reel 12, and cause the take-up reel 12 to rotate.

(Pulse Generation Circuit)

The pulse generation circuit 14 is a circuit for supplying a recording pulse current PC (see FIG. 1C) to the servo signal write head 15, and comprised of electronic components of various kinds. The pulse generation circuit 14 is configured to consecutively generate a plus pulse current PP of a positive polarity and a zero current ZC alternately, i.e., PP→ZC→PP→ZC, in this sequence, and then stop generating a current (i.e., hold a zero current ZC) for a specific period of time, based upon a pulse control signal received from the control unit 16, to thereby generate a recording pulse current PC (see FIG. 1C).

Figure 1C:
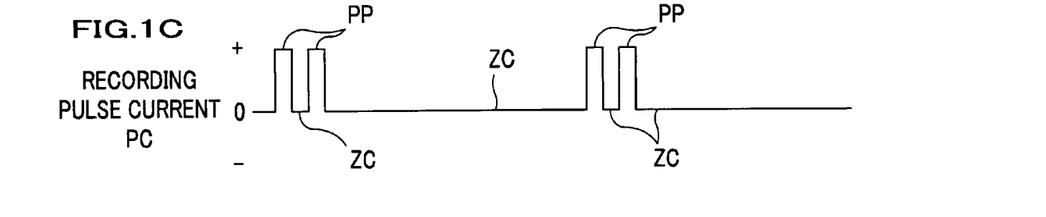
FIG. 1C is a graphical representation of a recording pulse current for recording the servo signal.

The pulse generation circuit 14 supplies the thus-generated recording pulse current PC to a coil (not shown) of the servo signal writer head 15. It is appreciated that the current value of the plus pulse current PP is determined, with consideration given to the characteristics of the coil of the servo signal write head 15, such that the current value is sufficient for the servo signal write head 15 to magnetize a magnetic layer of the magnetic tape MT. It is also appreciated that a pulse width (duration) of the plus pulse current PP is determined, with consideration given to the tape-transport speed of the magnetic tape MT, the shape of the head gap of the servo signal write head 15, and the like, such that the pulse width may define a fixed length of the servo pattern SP in the lengthwise direction of the magnetic tape MT. The specific period of time for which the zero current is to be held is determined, with consideration given to the tape-transport speed of the magnetic tape MT and the like, such that the specific period of time may define a length of each of regular intervals at which the servo patterns SP are formed.

(Servo Signal Write Head)

The servo signal write head 15 is a magnetic head for recording a servo signal SS, and provided with a coil (not shown) and one or more head gaps (not shown) formed therein. In this embodiment, a plurality of head gaps are arranged in a row such that the head gaps are positioned at locations corresponding to the positions of the servo bands SB in the widthwise direction of the magnetic tape MT. Each head gap is formed by photolithographic techniques in such a manner as applied in the field of the semiconductor technologies, and shaped into two stripes (arranged like two nonparallel sides of four sides making up a trapezoid) of which one is inclined forwardly and the other is inclined backwardly with respect to the tape-transport direction, with angles of inclination thereof determined respectively as prescribed.

(DC Erasing Head)

The DC erasing head 20 is disposed upstream relative to the servo signal write head 15 in the tape-transport direction. The DC erasing head 20 is a known magnetic head for magnetizing the servo band SB and the data band DB of the magnetic tape MT entirely and uniformly in the normal direction of magnetization, before the servo signal write head 15 writes a servo signal SS on the servo band SB of the magnetic tape MT. The DC erasing head 20 is made up for example of an electromagnet which is configured to produce a magnetic field of which a direction of magnetization is a single direction, upon application of a direct current.

(Verification Head)

The verification head 17 is disposed downstream relative to the servo signal write head 15 in the tape-transport direction. The verification head 17 is a magnetic head for verifying a servo signal SS recorded on the servo band SB. The verification head 17 is configured to read out the servo signal SS using a read element (not shown), and forward the read-out signal to the control unit 16.

(Control Unit)

The control unit 16 is a device for controlling an operation of each component of the servo writer 10, and includes a central processing unit or CPU, and various other devices, such as a storage unit. The control unit 16 is configured to generate, and furnish to the drive unit 13, a motor current signal for controlling a motor current of a drive unit 13, so as to maintain a constant transport speed of the magnetic tape MT during writing operation of the servo signal SS.

The control unit 16 is also configured to generate, and furnish to the pulse generation circuit 14, a pulse control signal for controlling a current value, a pulse width and generation timing of a plus pulse current PP of a recording pulse current PC so as to establish a servo signal SS defining a width of a servo pattern SP in the normal direction and a length of each of regular intervals at which the servo patterns SP are formed. In other words, the control unit 16 produces a pulse pattern of a plus pulse current PP→a zero current ZC→a plus pulse current PP→a zero current ZC as described above (see FIG. 1C).

Moreover, the control unit 16 is provided with a storage space in which a variety of data are stored, such as a width of a servo pattern in the normal direction and an interval at which adjacent servo patterns are spaced, which are supposed to be measured when a servo signal SS is written on the magnetic tape MT in conformity with a prescribed standard. The control unit 16 is configured to detect a width in the normal direction and an interval of adjacent servo patterns SP of a servo signal SS recorded by the servo signal write head 15, based upon a read-out signal of the servo signal SS received from the verification head 17, and compare the detected values with the data stored for the servo pattern SP, to determine whether or not the servo signal SS is in conformity with the prescribed standard.

The control unit 16 comprises a controller 160 (see FIG. 3) for regulating a recording current to be supplied to at least one of the DC erasing head 20 and the servo signal write head 15. The functions of the controller 160 will hereafter be described in detail with reference to FIGS. 3-7.

Figure 3:
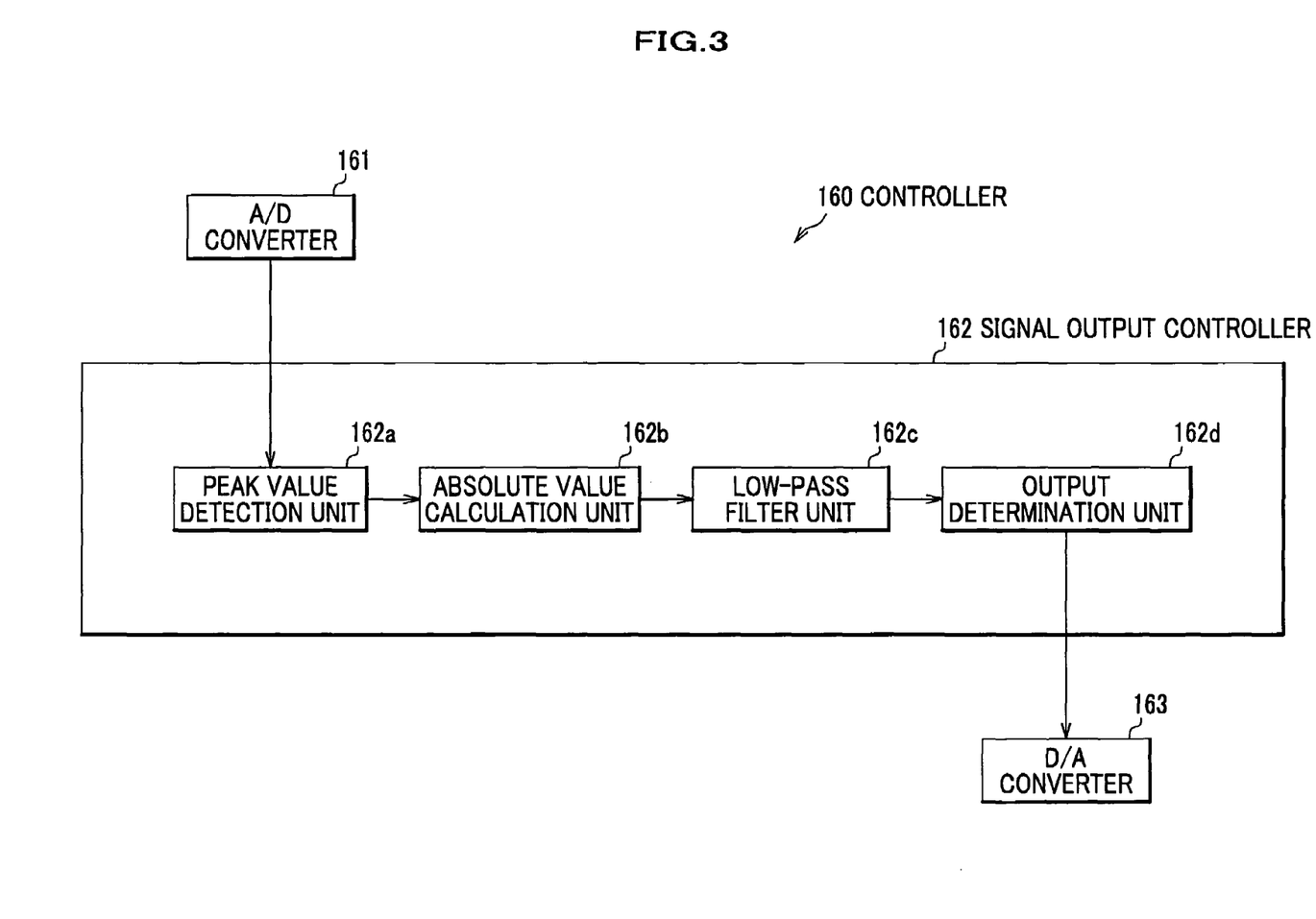
FIG. 3 is a block diagram showing a controller of the servo writer according to an exemplary embodiment of the present invention.

FIG. 3 is a block diagram showing a controller of a servo writer according to an exemplary embodiment of the present invention. As shown in FIG. 3, the controller 160 includes an analog-to-digital (A/D) converter 161, a signal output controller 162 and a digital-to-analog (D/A) converter 163.

Figure 4:
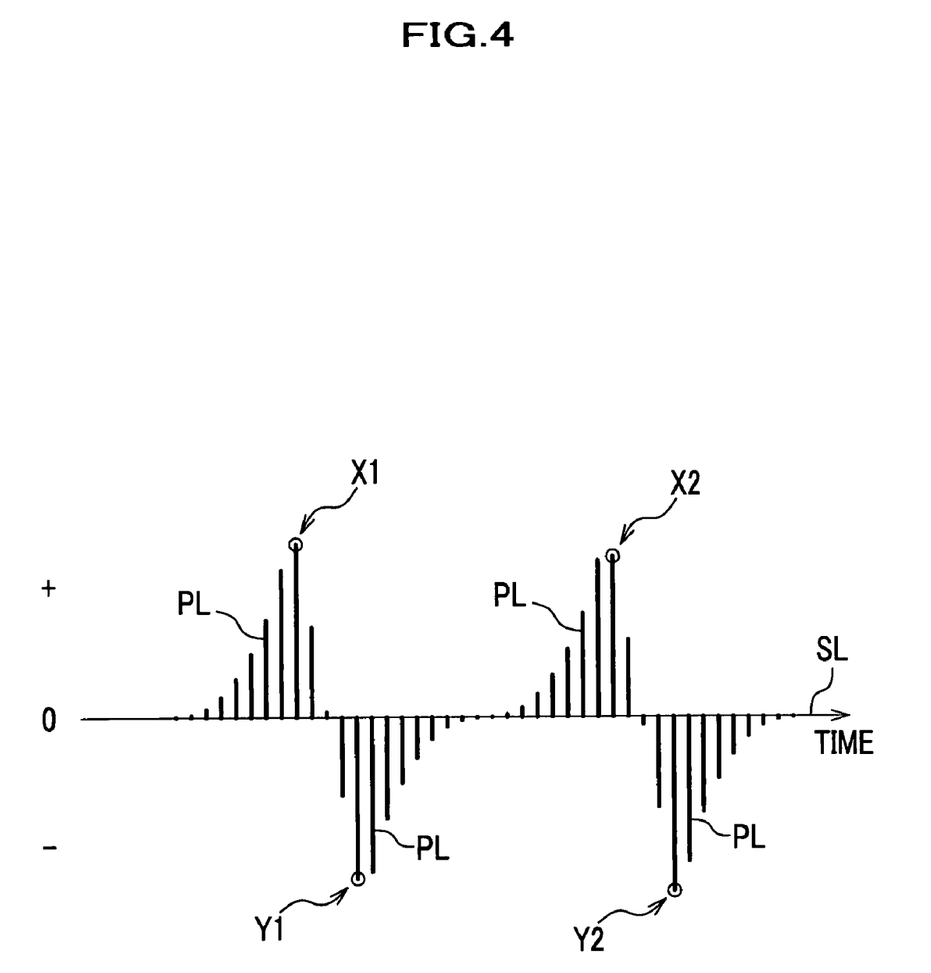
FIG. 4 is a graphical representation of a digitized servo signal resulting from an analog-to-digital conversion effected in an A/D converter.

The A/D converter 161 includes a circuit configured to convert a servo signal read out by the verification head 17 into a digital signal. Thus-digitized servo signal is output to the signal output controller 162. FIG. 4 shows a digital signal (digitized servo signal) resulting from an analog-to-digital conversion effected in the A/D converter 161. As shown in FIG. 4, the servo signal given to the signal output controller 162 has been converted into a digital signal containing pulses PL.

The signal output controller 162 is configured to regulate a recording current to be supplied to at least one of the DC erasing head 20 and the servo signal write head 15, based upon a digitized servo signal received from the A/D converter 161.

The signal output controller 162 includes a central processing unit (CPU), various types of storage devices and other components, as described above for the control unit 16. The signal output controller 162 may be configured to operate by the CPU loading data and programs into a main memory from a read only memory (ROM), manipulating the loaded data, and executing the loaded programs. The signal output controller 162 is a digital circuit that can be fabricated on a small integrated-circuit chip, and thus may preferably but not necessarily be implemented with integrated circuits or ICs, such as a programmable logic device (PLD) and a field programmable gate array (FPGA), in which a user can furnish a program for simulation of its processing prior to actual execution. Integration of circuit components of the signal output controller 162 enables higher-speed processing by a circuit embodied in smaller area on the board in comparison with simulation of a circuit executed by means of software.

The D/A converter 163 includes a circuit configured to convert the recording current value to be supplied to at least one of the DC erasing head 20 and the servo signal write head 15 as determined in the signal output controller 162, into an analog signal.

The next discussion will be directed to the signal output controller 162. As shown in FIG. 3, the signal output controller 162 includes a peak value detection unit 162a, an absolute value calculation unit 162b, a low-pass filter unit 162c and an output determination unit 162d.

The peak value detection unit 162a is configured to detect a positive-going peak value X1 or X2 and a negative-going peak value Y1 or Y2 in each pulse PL (see FIG. 4) of the digitized servo signal received from the A/D converter 161. The positive-going peak value X1, X2 refers to the maximum distance from a reference line SL in a positive-going portion of the pulse (as indicated by a positive value), whereas the negative-going peak value Y1, Y2 refers to the maximum distance from the reference line SL in a negative-going portion of the pulse (as indicated by a negative value). It is to be understood that the peak value detection unit 162a consecutively receives pulses PL afterwards, i.e., in ordinary cases, more than two pulses PL though only two pulses PL are illustrated in FIG. 4.

The absolute value calculation unit 162b is configured to calculate an absolute value |X−Y| of a difference between the positive-going peak value X and the negative-going peak value Y which are detected in the peak value detection unit 162a.

Figure 5A:
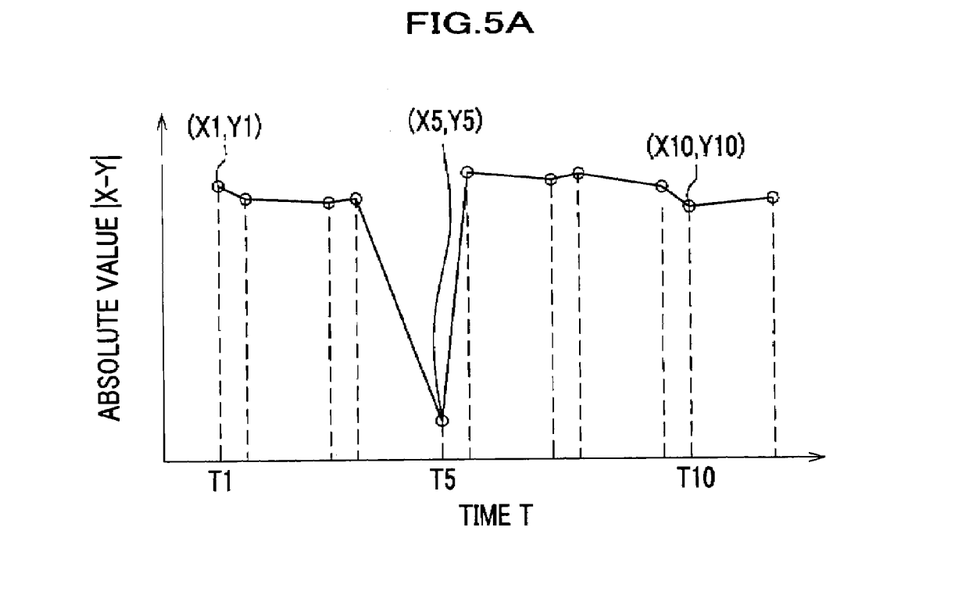
FIG. 5A shows a state before processing in a low-pass filter unit.
Figure 5B:
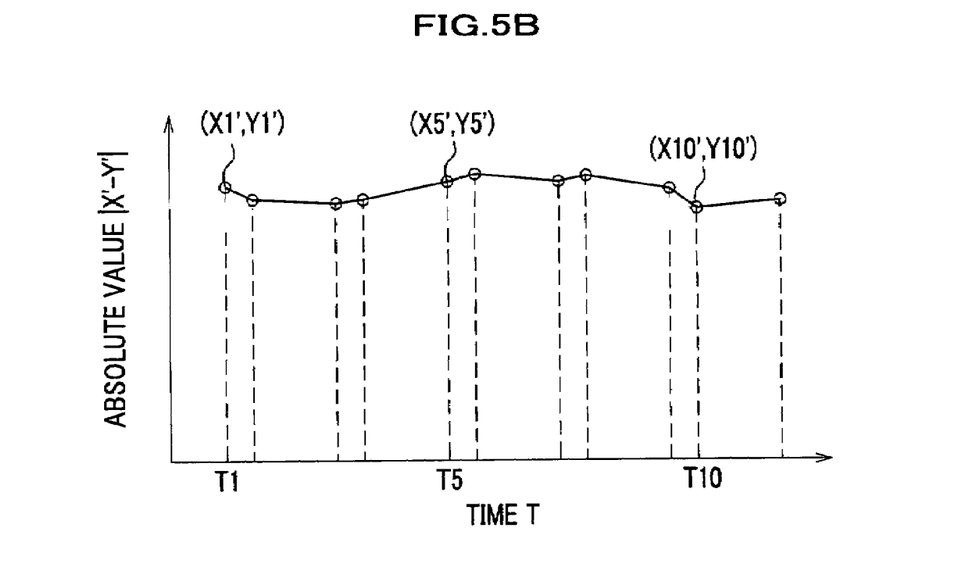
FIG. 5B shows a state after processing in the low-pass filter unit.

FIGS. 5A and 5B are graphs showing correspondence between the absolute value |X−Y| calculated in the absolute value calculation unit 162b and a time T of detection of the positive-going peak value X or the negative-going peak value Y corresponding to the absolute value. FIG. 5A shows a state before processing in a low-pass filter unit 162c, and FIG. 5B shows a state after processing in the low-pass filter unit 162c. Processing in the low-pass filter unit 162c will be described later. Depicted in FIG. 5A are absolute values |X−Y|=|X1−Y1| ... |X11−Y11| at times T1 ... T11, though calculations of the absolute values consecutively proceed afterwards. It is to be understood that the times T have been calculated beforehand from the positions in which the servo signals are written and the transport speed of the magnetic tape MT. The absolute value |X5−Y5| at the time T5 belongs to a predetermined higher-frequency region ("high-frequency region").

The low-pass filter unit 162c is configured to cut off the high-frequency region of absolute values (those belonging to the high-frequency region) among the absolute values calculated in the absolute value calculation unit 162, while passing the absolute values belonging to the other (lower) frequency region, i.e., allowing a transmitted value to follow a change in the absolute value as long as the peak value detection time of the input absolute value falls out of the high-frequency region. A frequency of each input absolute value is calculated in the low-pass filter unit 162c, based upon times T of detection of respective peak values corresponding to the absolute values, which peak values are received consecutively by the low-pass filter unit 162c. Whether or not the input absolute value belongs to the high-frequency region may be determined based upon whether or not the frequency of the absolute value is below a predetermined (cutoff) frequency. The predetermined (cutoff) frequency may include a value prescribed in the adopted standard.

For example, the cutoff frequency may be determined by 1/(Dropout Permissible Length/Transport Speed), with the dropout (DO) permissible length=2.2 mm, transport speed=4 m/s in conformity with the Linear Tape-Open (LTO) standard, resulting in the cutoff frequency=1818 Hz. In this instance, even when there is any region of frequency too low below the predetermined frequency, the transmitted value may be allowed to follow the change in the absolute value as long as the frequency is below the predetermined frequency, because the magnetic tape MT with servo signal too low in frequency would not be shipped thanks to outgoing inspection based upon the dropout specifications.

As shown in FIG. 5B, after processing in the low-pass filter unit 162c, the absolute value |X5−Y5| at the time T5 is determined to belong to the high-frequency region, and is thus cut off.

In an embodiment as shown in FIG. 2, where the DC erasing head or the servo signal write head 15 are located far from the verification head 17, a drop-in (increase in output) or a drop-out (decrease in output) detected from a servo signal read out in the verification head 17 would possibly effect an undesired change in the output of the DC erasing head 20 or the servo signal write head 15; however, the low-pass filter unit 162c serves to prevent such undesirable change in the output of the DC erasing head 20 or the servo signal write head 15.

The output determination unit 162d is configured to determine an output value of a recording current to be supplied to the DC erasing head 20, based upon the absolute value transmitted through the low-pass filter unit 162c, in one embodiment. Alternatively or additionally, the output determination unit 162*d* may be configured to determine an output value of a recording current to be supplied to the servo signal write head 15. In the latter embodiment, a pulse control signal according to the output value of the recording current is supplied through the A/D converter 163 to the pulse generation circuit 14, and the pulse generation circuit 14 in turn supplies the recording pulse current PC according to the pulse control signal to the servo signal write head 15.

Figure 6:
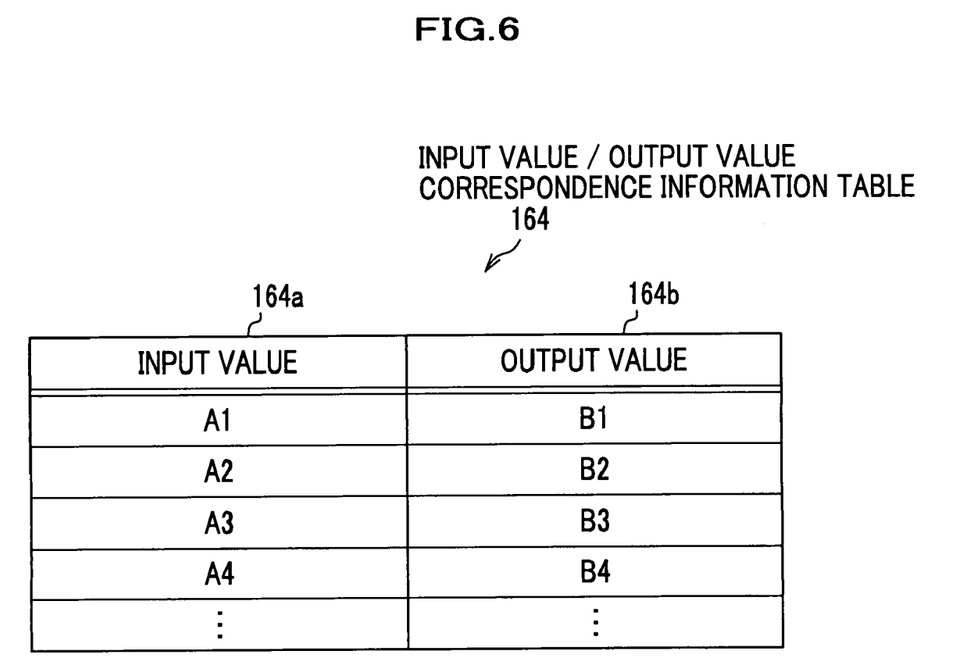
FIG. 6 is an example, as illustrated in a table, of a set of input value/output value correspondence information.

FIG. 6 is an example, as illustrated in a table, of a set of input value/output value correspondence information in which input values (absolute values of differences of the positive-going peak values and the negative-going peak values) are associated with corresponding recording current values. As shown in FIG. 6, an input value/output value correspondence information table 164 includes a set of data consisting of a pair of an input value 164*a* and an output value 164*b*.

In one embodiment, the output determination unit 162*d* may be configured to determine an output value of the recording current to be supplied to the DC erasing head 20 or the servo signal write head 15 for example by searching the input value/output value correspondence information table 164 for an input value 164*a* matching an absolute value of a difference of the positive-going peak value and the negative-going peak value, and obtaining an output value 164*b* corresponding to the matching input value 164*a* to thereby determine the output value 164*b* of the recording current. Typically, when a thickness of the magnetic layer is greater, a read-out signal acquired from a servo signal by the verification head 17 tends to be smaller, and an absolute value calculated in the absolute value calculation unit 162*b* is smaller; thus, an output value of the recording current may preferably be greater. On the other hand, when a thickness of the magnetic layer is smaller, a read-out signal acquired from a servo signal by the verification head 17 tends to be greater, and an absolute value calculated in the absolute value calculation unit 162*b* is greater; thus, an output value of the recording current may preferably be smaller. In other words, it may preferably be established that the smaller the input value 164*a* is, the greater the output value 164*b* is set, while the greater the input value 164*a* is, the smaller the output value 164*b* is set.

The input value/output value correspondence information table 164 may preferably but not necessarily be updated automatically with a predetermined timing by an input value/output value correspondence information table updating system (not shown). In an exemplary embodiment, the input value/output value correspondence information table updating system (not shown) is configured to receive traceability information (tape information) from outside, and automatically update the input value/output value correspondence information table 164 in accordance with the received traceability information. In another embodiment, the input value/output value correspondence information table updating system (not shown) is configured to receive information recorded in a servo signal (or a servo pattern), and automatically update the input value/output value correspondence information table 164 in accordance with the received information for each kind of the servo signal (or servo pattern).

In an alternative embodiment, the output determination unit 162*d* may be configured to determine an output value of the recording current to be supplied to the DC erasing head 20 or the servo signal write head 15 for example by performing a proportional-integral-derivative (PID) control to determine the output value of the recording current with a static target value set for negative feedback. In this instance, the target value may be set such that the output value will fall within a predetermined range prescribed in the LTO standard.

Figure 7:
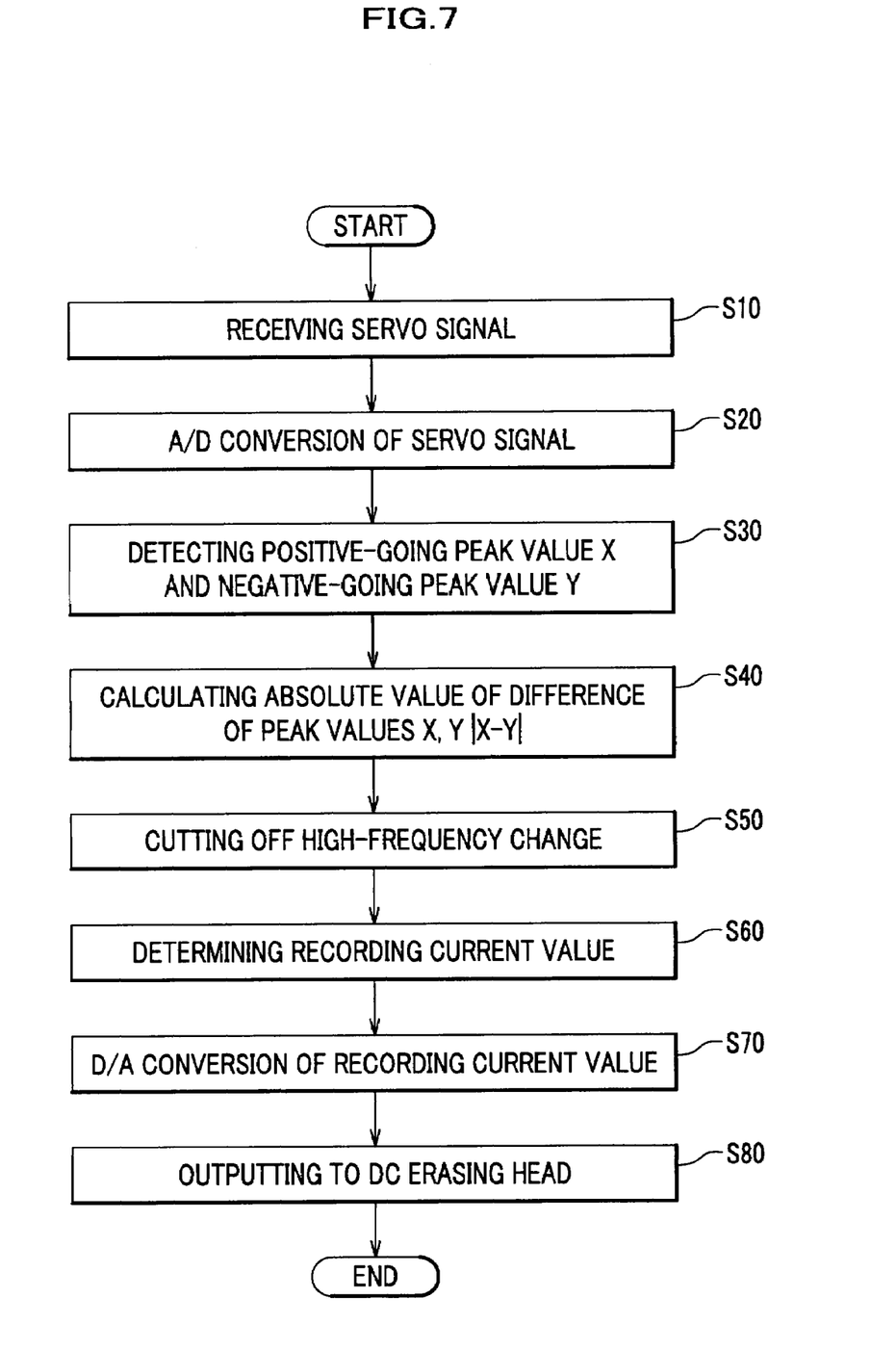
FIG. 7 is a flowchart of a control process executed by a controller according to an exemplary embodiment of the present invention.

Next, a control process performed by a controller 160 provided in the illustrated embodiment (see FIG. 3) will be described in detail, with reference to FIG. 7, which is a flowchart showing an exemplary control process consistent with the present invention. First, the A/D converter 161 receives a servo signal read out by the verification head 17 (step S10), and performs an analog-to-digital (A/D) conversion of the read-out servo signal from an analog signal into a digital signal (step S20). The peak value detection unit 162*a* received thus-digitized servo signal from the A/D converter 161, and detects a positive-going peak value X and a negative-going peak value Y in each pulse contained in the digitized servo signal (step S30). Subsequently, the absolute value calculation unit 162*b* calculates an absolute value |X−Y| of a difference between the peak values X and Y (step S40). The low-pass filter unit 162*c* cuts off change (fluctuations) in the high-frequency region (step S50). The output determination unit 162*d* determines an output value of the recording current (step S60). Then, the D/A converter 163 converts the output value of the recording current into an analog signal (D/A conversion) (step S70), and the analog-converted recording current is output to the DC erasing head 20 (step S80). The output determination unit 162*d* may alternatively be configured to determine (in step S60) an output value of the recording current to be supplied to the servo signal write head 15 (in step S80).

[Manufacturing Method of Magnetic Tape]

Next, a manufacturing method of a magnetic tape MT using a servo writer 10 as described above will be described in detail. In the following description, especially for the purpose of mentioning some portions of the magnetic tape MT, reference will be made to FIGS. 1A-1C, where appropriate.

First, as shown in FIG. 2, a magnetic tape MT in the form of a pancake is set on the supply reel 11 of the servo writer 10, and a leading edge of the magnetic tape MT is drawn out. The leading edge of the magnetic tape MT is passed along a tape-transport route guided by guides 18 and the like, and joined to a core of the take-up reel 12.

Thereafter, the drive unit 13 is actuated to drive and rotate the take-up reel 12, which in turn takes up the magnetic tape MT, and causes the magnetic tape MT to run along the tape-transport route from the supply reel 11 to the take-up reel 12.

The magnetic tape MT supplied from the supply reel 11 is passed beside the DC erasing head 20 at which the servo bands SB and the data bands DB are magnetized entirely and uniformly in the normal direction of magnetization.

Further, servo signals SS are written by the servo signal write head 15 on the servo bands of the running magnetic tape MT which have been magnetized in the normal direction by the DC erasing head 20. To be more specific, the control unit 16 feeds a patterned pulse train of recording pulse current PC through a coil forming the head gap of the servo signal writer head 15. The recording pulse current PC has a predetermined cycle of alternating plus pulse currents PP and zero currents ZC: PP→ZC→PP→ZC (see FIG. 1C). With the recording pulse current PC is fed from the pulse generation circuit 14, the servo signal write head 15 effects magnetization of which a direction is opposite to the normal direction, in the magnetic layer of the magnetic tape MT by leakage flux from the head gap during the time when a plus pulse current PP is being fed through the coil, but not during the time when a zero current ZC is being fed through the coil. As a result, servo patterns SP are formed on the servo bands SB wherein the servo patterns SP ('figures') have magnetization effected in the reverse direction while 'ground' areas other than those in which the servo patterns SP are formed have magnetization retained of which the direction is the normal direction.

The magnetic tape MT on which servo signals SS have been written as described above is passed beside the verification head 17 at which the servo signal SS is read out and subjected to verification in the control unit 16, and then taken up by the take-up reel 12. In this process, the output value of the recording current is regulated based upon the output of the servo signals SS read out by the verification head 17. Thereafter, the magnetic tape MT is cut by the tape length predetermined according to the product specifications, and encased in a cartridge case or the like (not shown).

Advantageous Effects of the Illustrated Embodiments

The servo writer 10 and the manufacturing method of a magnetic tape MT as described above have the following advantageous effects.

With the above-described servo writer 10 and manufacturing method of a magnetic tape MT using the servo writer 10, a servo band SB of the magnetic tape MT is magnetized entirely in a normal direction, and then magnetized in a direction opposite to the normal direction to thereby write a servo signal SS, with the result that the ratio or quantity of change in the magnetic field detected when a magnetic head H retrieves the servo signal becomes greater, and thus the output of the servo signal SS can be increased. This improves a signal-to-noise ratio of a read-out signal of the servo signal SS, making its servo control functionality more precise in controlling the position of the magnetic head H. Furthermore, a servo signal SS can be written on a magnetic tape MT in accordance with variations in thickness of a magnetic layer.

Variations and Modifications of the Embodiments

Although the exemplary embodiments of the present invention have been described above, the present invention is not limited to the illustrated embodiments; rather it is contemplated that various modifications and changes may be made in the present invention without departing from the spirit and scope thereof.

For example, the illustrated embodiments are embodied in a servo writer 10 for writing a servo signal SS on a magnetic tape MT as shown in FIG. 2, but a signal control method consistent with the present invention may be applied to any other types of magnetic tape drive other than a servo writer 10.

In the embodiment shown in FIG. 1A, the servo bands SB and the data bands DB of the magnetic tape MT are entirely and uniformly magnetized in the normal direction; however, the magnetization in the normal direction may be effected solely in the servo bands SB, with the data bands retained without magnetization effected in one direction.

The signal output controller 162 according to the embodiment as shown in FIG. 3 includes an absolute value calculation unit 162b, but may be configured to include no absolute value calculation unit 162. In this alternative embodiment, the peak value detection unit 162a may be configured to detect either of a positive-going peak value and a negative-going peak value in each pulse contained in a digital signal, and the low-pass filter unit 162c may be configured to transmit as an input value the positive or negative-going peak value, wherein the input value is allowed to follow a change in the peak value as long as a frequency calculated based upon times of detection of respective peak values is below a predetermined frequency, and the output determination unit 162d may be configured to determine an output value of the recording current to be supplied to the DC erasing head or the servo signal write head, based upon the input value transmitted through the low-pass filter unit.

What is claimed is:

1. A servo writer comprising:
a direct-current erasing head configured to magnetize a servo band of a magnetic tape, wherein a direction of magnetization thereof is a first direction of lengthwise directions of the magnetic tape;
a servo signal write head configured to record a servo signal on the servo band by magnetization of which a direction is a second direction opposite to the first direction;
a verification head configured to retrieve the servo signal recorded on the servo band;
an analog-to-digital converter configured to convert the servo signal retrieved by the verification head to a digital signal; and
a signal output controller configured to regulate a recording current to be supplied to at least one of the direct-current erasing head and the servo signal write head, wherein the signal output controller comprises:
a peak value detection unit configured to detect a peak value in each pulse of the digital signal output from the analog-to-digital converter, wherein the peak value comprises either of a positive-going peak value and a negative-going peak value;
a low-pass filter unit configured to transmit as an input value the peak value received from the peak value detection unit, wherein the input value is allowed to follow a change in the peak value as long as a frequency calculated based upon times of detection of respective peak values is below a predetermined frequency; and
an output determination unit configured to determine an output value of the recording current, based upon the input value transmitted through the low-pass filter unit.

2. A servo writer comprising:
a direct-current erasing head configured to magnetize a servo band of a magnetic tape, wherein a direction of magnetization thereof is a first direction of lengthwise directions of the magnetic tape;
a servo signal write head configured to record a servo signal on the servo band by magnetization of which a direction is a second direction opposite to the first direction;
a verification head configured to retrieve the servo signal recorded on the servo band;
an analog-to-digital converter configured to convert the servo signal retrieved by the verification head to a digital signal;
a signal output controller configured to regulate a recording current to be supplied to at least one of the direct-current erasing head and the servo signal write head, wherein the signal output controller comprises:
a peak value detection unit configured to detect a positive-going peak value and a negative-going peak value in each pulse of the digital signal output from the analog-to-digital converter;
an absolute value calculation unit configured to calculate an absolute value of a difference of the positive-going peak value and the negative-going peak value in each pulse;
a low-pass filter unit configured to transmit as an input value the absolute value received from the absolute value calculation unit, wherein the input value is allowed to follow a change in the absolute value as long as a frequency calculated based upon times of detection of respective peak values corresponding to the absolute values is below a predetermined frequency; and an output determination unit configured to determine an output value of the recording current, based upon the input value transmitted through the low-pass filter unit.

3. The servo writer according to claim 1, wherein the output determination unit comprises:

a set of input value/output value correspondence information in which input values are associated with corresponding recording current values; and means for obtaining from the set of input value/output value corresponding information the output value of the recording current corresponding to the input value transmitted through the low-pass filter unit.

4. The servo writer according to claim 2, wherein the output determination unit comprises:

a set of input value/output value correspondence information in which input values are associated with corresponding recording current values; and means for obtaining from the set of input value/output value corresponding information the output value of the recording current corresponding to the input value transmitted through the low-pass filter unit.

5. The servo writer according to claim 1, wherein the output determination unit comprises means for performing a proportional-integral-derivative control to determine the output value of the recording current based upon the input value.

6. The servo writer according to claim 2, wherein the output determination unit comprises means for performing a proportional-integral-derivative control to determine the output value of the recording current based upon the input value.

7. A signal output control method for regulating a recording current to be supplied to a magnetic head which is configured to effect a change in magnetization on a magnetic tape, the method comprising:

receiving a digital signal resulting from analog-to-digital conversion of a servo signal recorded on a servo band of the magnetic tape;

detecting a peak value in each pulse of the received digital signal, wherein the peak value comprises either of a positive-going peak value and a negative-going peak value;

transmitting the peak value as an input value which is allowed to follow a change in the peak value as long as a frequency calculated based upon times of detection of respective peak values is below a predetermined frequency; and determining an output value of the recording current, based upon the transmitted input value.

8. A signal output control method for regulating a recording current to be supplied to a magnetic head which is configured to effect a change in magnetization on a magnetic tape, the method comprising:

receiving a digital signal resulting from analog-to-digital conversion of a servo signal recorded on a servo band of the magnetic tape;

detecting a positive-going peak value and a negative-going peak value in each pulse of the received digital signal;

calculating an absolute value of a difference of the positive-going peak value and the negative-going peak value in each pulse;

transmitting the absolute value as an input value which is allowed to follow a change in the absolute value as long as a frequency calculated based upon times of detection of respective peak values corresponding to the absolute values is below a predetermined frequency; and determining an output value of the recording current, based upon the transmitted input value.

9. The signal output control method according to claim 7, wherein the determining the output value of the recording current comprises:

providing a set of input value/output value correspondence information in which input values are associated with corresponding recording current values; and obtaining from the set of input value/output value corresponding information the output value of the recording current corresponding to the transmitted input value.

10. The signal output control method according to claim 8, wherein the determining the output value of the recording current comprises:

providing a set of input value/output value correspondence information in which input values are associated with corresponding recording current values; and obtaining from the set of input value/output value corresponding information the output value of the recording current corresponding to the transmitted input value.

11. The signal output control method according to claim 7, wherein the determining the output value of the recording current comprises performing a proportional-integral-derivative control based upon the transmitted input value.

12. The signal output control method according to claim 8, wherein the determining the output value of the recording current comprises performing a proportional-integral-derivative control based upon the transmitted input value.

13. A signal output control program embodied on a computer readable medium for causing a computer to execute the signal output control method according to claim 7.

14. A signal output control program embodied on a computer readable medium for causing a computer to execute the signal output control method according to claim 8.

15. A magnetic tape manufacturing method comprising:

magnetizing a servo band of a magnetic tape entirely in a first direction of lengthwise directions of the magnetic tape;

recording a servo signal on the servo band magnetized in the first direction, by supplying a servo signal write head with a unipolar recording pulse current for magnetization of which a direction is a second direction opposite to the first direction; and regulating a recording current for magnetizing the servo band in the first direction, based upon the output value of the recording current determined by the signal output control method according to claim 7.

16. A magnetic tape manufacturing method comprising:

magnetizing a servo band of a magnetic tape entirely in a first direction of lengthwise directions of the magnetic tape;

recording a servo signal on the servo band magnetized in the first direction, by supplying a servo signal write head with a unipolar recording pulse current for magnetization of which a direction is a second direction opposite to the first direction; and regulating a recording current for magnetizing the servo band in the first direction based upon the output value of the recording current determined by the signal output control method according to claim 8.

17. A magnetic tape manufacturing method comprising:
magnetizing a servo band of a magnetic tape entirely in a first direction of lengthwise directions of the magnetic tape;
recording a servo signal on the servo band magnetized in the first direction, by supplying a servo signal write head with a unipolar recording pulse current for magnetization of which a direction is a second direction opposite to the first direction; and
regulating the unipolar recording pulse current supplied to the servo signal write head, based upon the output value of the recording current determined by the signal output control method according to claim 7.

18. A magnetic tape manufacturing method comprising:
magnetizing a servo band of a magnetic tape entirely in a first direction of lengthwise directions of the magnetic tape;
recording a servo signal on the servo band magnetized in the first direction, by supplying a servo signal write head with a unipolar recording pulse current for magnetization of which a direction is a second direction opposite to the first direction; and
regulating the unipolar recording pulse current supplied to the servo signal write head, based upon the output value of the recording current determined by the signal output control method according to claim 8.

* * * * *